US011354504B2

(12) United States Patent
Motahari Nezhad et al.

(10) Patent No.: US 11,354,504 B2
(45) Date of Patent: Jun. 7, 2022

(54) MULTI-LINGUAL ACTION IDENTIFICATION

(71) Applicant: International Business Machines Corporation, Armonk, NY (US)

(72) Inventors: Hamid Reza Motahari Nezhad, San Jose, CA (US); Pravar Dilip Mahajan, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 16/507,143

(22) Filed: Jul. 10, 2019

(65) Prior Publication Data

US 2021/0011973 A1  Jan. 14, 2021

(51) Int. Cl.
*G06F 40/284* (2020.01)
*G06N 5/04* (2006.01)
(Continued)

(52) U.S. Cl.
CPC .............. *G06F 40/284* (2020.01); *G06F 9/54* (2013.01); *G06N 5/04* (2013.01); *G06N 20/00* (2019.01)

(58) Field of Classification Search
CPC ........ G06F 9/54; G06F 40/242; G06F 40/253; G06F 40/284; G06F 40/40; G06F 9/451; G06F 16/22; G06F 16/285; G06F 16/3334; G06F 16/3344; G06F 16/355; G06F 16/94; G06F 17/2785; G06F 40/10; G06F 40/20; G06F 40/237; G06F 40/279;
(Continued)

(56) References Cited

U.S. PATENT DOCUMENTS

| 4,654,798 A | 3/1987 | Taki et al. |
| 5,799,268 A * | 8/1998 | Boguraev ............. G06F 40/289 704/9 |

(Continued)

OTHER PUBLICATIONS

H. Motahari Nezhad et al., "eAssistant Cognitive Assistance for Identification and Auto-Triage of Actionable Conversations." In Proceedings of the 26th International Conference on World Wide Web Companion (WWW '17 Companion). International World Wide Web Conferences Steering Committee, Republic and Canton of Geneva, Switzerland, 89-98, 2017.

(Continued)

*Primary Examiner* — Gerald Gauthier
(74) *Attorney, Agent, or Firm* — Lieberman & Brandsdorfer, LLC

(57) ABSTRACT

Embodiments relate to an intelligent computer platform to identify and process communications across multiple languages. An originating communication is identified, including identification of language, action tokens, and linguistic features. A first map of the identified action tokens and linguistic features from the originating language to a second format is created and populated into identifying machine learning model (MLM). A second communication is identified, including the originating language, action tokens, and linguistic features, and a second map is created of the identified action tokens and linguistic features of the second communication. The second map and the MLM are leveraged to identify and return a predicted action token class of the identified action tokens in the second communication.

18 Claims, 9 Drawing Sheets

(51) Int. Cl.
*G06N 20/00* (2019.01)
*G06F 9/54* (2006.01)

(58) Field of Classification Search
CPC ....... G06F 40/289; G06F 40/30; G06N 3/006;
G06N 5/04; G06N 20/00; G06N 3/084;
G06N 3/126; G06N 5/022; G06Q
10/0637; G06Q 50/14; G06Q 10/107;
G10L 15/1822; G10L 15/005; G10L
15/075; G10L 15/22; H04L 51/02; H04L
51/10; H04L 51/18
USPC ......... 704/9, 2; 706/14, 46, 11, 20; 707/739,
707/769; 709/229
See application file for complete search history.

(56) References Cited

U.S. PATENT DOCUMENTS

| | | | | | |
|---|---|---|---|---|---|
| 7,822,699 | B2* | 10/2010 | Katariya | ............. | G06F 16/3334 |
| | | | | | 706/45 |
| 8,930,180 | B1* | 1/2015 | Murray | ................... | G06F 40/10 |
| | | | | | 704/9 |
| 9,904,669 | B2* | 2/2018 | Gunaratna | ............. | G06F 40/284 |
| 11,176,180 | B1* | 11/2021 | Gudur | ................ | G06F 16/24578 |
| 2001/0027488 | A1* | 10/2001 | Hodgkin | ................ | G06F 16/94 |
| | | | | | 709/229 |
| 2007/0124263 | A1* | 5/2007 | Katariya | ............. | G06F 16/3334 |
| | | | | | 706/14 |
| 2007/0156392 | A1* | 7/2007 | Balchandran | ......... | G06F 40/237 |
| | | | | | 704/9 |
| 2009/0254336 | A1* | 10/2009 | Dumais | ................... | G06F 9/451 |
| | | | | | 704/9 |
| 2010/0179961 | A1* | 7/2010 | Berry | ................... | G06F 40/284 |
| | | | | | 707/769 |
| 2011/0040553 | A1* | 2/2011 | Sasivarman | ............ | G06F 40/30 |
| | | | | | 704/9 |
| 2011/0119047 | A1* | 5/2011 | Ylonen | ................... | G06F 40/30 |
| | | | | | 704/9 |
| 2013/0262082 | A1* | 10/2013 | McKeeman | ............ | G06F 40/20 |
| | | | | | 704/9 |
| 2013/0268258 | A1* | 10/2013 | Patrudu | ................... | G06F 40/40 |
| | | | | | 704/2 |
| 2014/0046891 | A1* | 2/2014 | Banas | ..................... | G06N 5/022 |
| | | | | | 706/46 |
| 2014/0156259 | A1* | 6/2014 | Dolan | ..................... | G06F 40/40 |
| | | | | | 704/9 |
| 2014/0379615 | A1* | 12/2014 | Brigham | ................ | G06N 3/126 |
| | | | | | 706/11 |
| 2014/0380285 | A1* | 12/2014 | Gabel | ..................... | G06N 5/022 |
| | | | | | 717/139 |
| 2015/0066939 | A1* | 3/2015 | Misra | ..................... | G06F 16/355 |
| | | | | | 707/739 |
| 2015/0161101 | A1* | 6/2015 | Yao | ......................... | G06N 3/02 |
| | | | | | 704/9 |
| 2016/0117313 | A1* | 4/2016 | Ajmera | ............... | G06F 16/3344 |
| | | | | | 704/9 |
| 2016/0162569 | A1* | 6/2016 | Erle | ...................... | G06F 40/221 |
| | | | | | 707/739 |
| 2016/0179786 | A1* | 6/2016 | Clark | ..................... | G16H 50/20 |
| | | | | | 704/9 |
| 2016/0179787 | A1* | 6/2016 | Deleeuw | ............... | G06F 40/289 |
| | | | | | 704/9 |
| 2016/0337295 | A1* | 11/2016 | Bennett | ................. | H04L 51/046 |
| 2017/0018269 | A1 | 1/2017 | Lev et al. | | |
| 2017/0075935 | A1 | 3/2017 | Lagos et al. | | |
| 2017/0124447 | A1* | 5/2017 | Chang | ................. | G06F 16/3334 |
| 2017/0132203 | A1 | 5/2017 | Kim et al. | | |
| 2017/0199866 | A1 | 7/2017 | Gunaratna et al. | | |
| 2017/0200093 | A1 | 7/2017 | Motahari Nezhad | | |
| 2018/0144264 | A1* | 5/2018 | Ranzato | ................. | G06N 20/00 |
| 2018/0225281 | A1* | 8/2018 | Song | ........................ | G06F 40/30 |
| 2018/0314689 | A1* | 11/2018 | Wang | ...................... | G10L 15/07 |
| 2019/0005018 | A1* | 1/2019 | Sharma | .................... | G06F 8/70 |
| 2019/0012605 | A1* | 1/2019 | Rajagopal | ............. | G06F 40/279 |
| 2019/0139147 | A1* | 5/2019 | Mittal | ................... | G06Q 40/12 |
| 2019/0266237 | A1* | 8/2019 | Ray | ...................... | G10L 15/1822 |
| 2019/0297031 | A1* | 9/2019 | Basheer | ................. | G06N 20/00 |
| 2020/0028925 | A1* | 1/2020 | Monge Nunez | ...... | G06F 16/903 |
| 2020/0104746 | A1* | 4/2020 | Strope | .................... | G06N 20/00 |
| 2020/0279200 | A1* | 9/2020 | Makhija | ................ | G06K 9/62 |
| 2020/0335083 | A1* | 10/2020 | Wan | ....................... | G10L 15/005 |
| 2021/0004733 | A1* | 1/2021 | Badua | ................ | G06Q 30/0631 |
| 2021/0011973 | A1* | 1/2021 | Motahari Nezhad | .... | G06N 5/04 |

OTHER PUBLICATIONS

R. Zellers et al., "Zero-Shot Activity Recognition with Verb Attribute Induction." (Submitted on Jul. 29, 2017 (v1), last revised Sep. 2, 2017 (this version, v2)) https://arxiv.org/abs/1707.09468.

A. Mallya et al., "Recurrent Models for Situation Recognition." https://arxiv.org/abs/1703.06233 (Submitted on Mar. 18, 2017 (v1), last revised Aug. 4, 2017 (this version, v2)).

K. Phucharasupa et al., "Classifying Thai action-verb classes based on paraphrasing behavior," 2014 International Computer Science and Engineering Conference (ICSEC), Khon Kaen, 2014, pp. 186-191.

T. Oezer, "Acquisition of Lexical Semantics through Unsupervised Discovery of Associations between Perceptual Symbols," 2008 7th IEEE International Conference on Development and Learning, Monterey, CA, 2008, pp. 19-24.

A. Fathi et al., "Understanding Egocentric Activities," 2011 International Conference on Computer Vision, Barcelona, 2011, pp. 407-414.

* cited by examiner

MULTI-LINGUAL ACTION IDENTIFICATION

BACKGROUND

The present embodiments relate to an artificial intelligence platform and machine learning for multi-lingual action identification. More specifically, the embodiments relate to training a multi-lingual action identification model and using the trained model to predict and categorize an action associated with a communication.

SUMMARY

The embodiments include a system, computer program product, and method for multi-lingual action identification and classification.

In one aspect, a computer system is provided with a processing unit and memory for use with an artificial intelligence (AI) computer platform to identify and process communications across multiple languages. The processing unit is operatively coupled to the memory and is in communication with the AI platform. As shown and described, the AI platform includes tools in the form of a training manager, a language manager, a converter, an evaluator, and an inference manager. The training manager functions to train a machine learning model (MLM) to identify an action token class associated with actions or action tokens in a communication. The language manager identifies an originating language in a first format of a received first communication, and identifies one or more action tokens and linguistic features in the first communication. The converter creates a first map of the identified action tokens and linguistic features from the originating language to a second format, and populates the first created map into the MLM. The evaluator identifies a second communication, and the language manager further identifies an originating language of a received second communication, including identification of one or more action tokens and linguistic features in the second communication. The converter creates a second map of the identified action tokens and linguistic features from the second communication to the second format. The inference manager leverages the created second map and the trained MLM to return a predicted action token class of the identified action tokens in the second communication. The predicted action token class is assigned to the second communication.

In another aspect, a computer program device is provided to identify and process communications across multiple languages. The program code is executable by a processing unit to train a machine learning model (MLM). Program code identifies an originating language in a first format of a received first communication, and further identifies one or more action tokens and linguistic features in the first communication. A first map is created of the identified action tokens and linguistic features from the originating language to a second format, and the first created map populates into the MLM. Program code identifies a second communication, including identification of an originating language of the second communication, and one or more action tokens and linguistic features in the second communication. A second map is created of the identified action tokens and linguistic features from the second communication to the second format. Program code further leverages the created second map and the trained MLM to return a predicted action token class of the identified action tokens in the second communication. The predicted action token class is assigned to the second communication.

In yet another aspect, a method is provided for identifying and processing communications across multi-lingual languages. An originating language of a received first communication is identified, and one or more action tokens and linguistic features of the first communication are identified. A first map is created of the identified action tokens and linguistic features from the originating language in a first format to a second format, and the first created map populates into a machine learning model (MLM). An originating language of a received second communication is identified, and one or more action tokens and linguistic features are also identified in the second communication. A second map is created of the identified action tokens and linguistic features from the second communication to the second format. The created second map and the trained MLM are leveraged and a predicted action token class of the identified action tokens in the second communication is assigned to the second communication.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
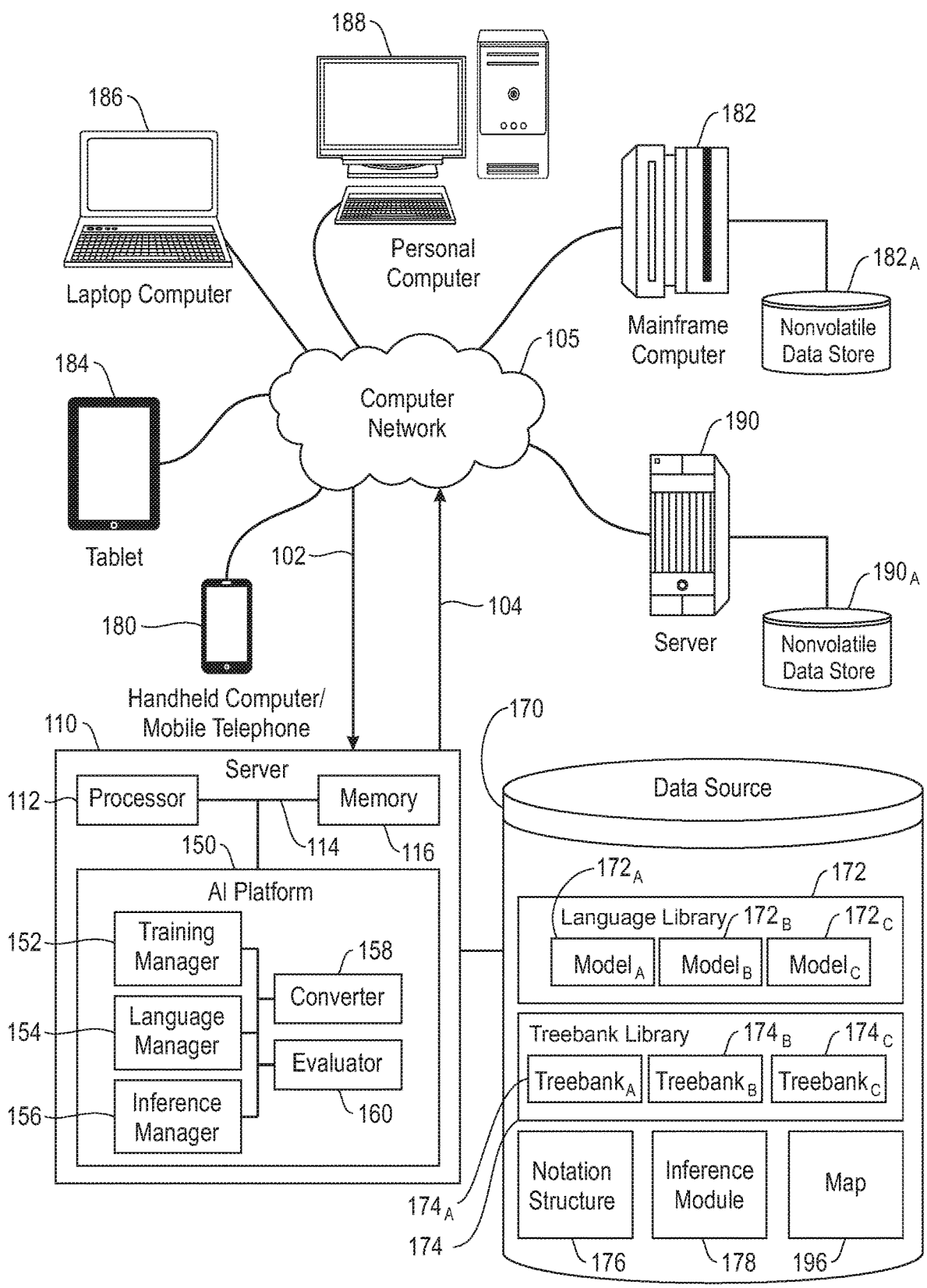
FIG. 1 depicts a system diagram illustrating an artificial intelligence platform computing system.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificial intelligent systems, natural language processing systems (such as the IBM Watson® artificially intelligent computer system and other natural language interrogatory answering systems) process natural language based on knowledge acquired by the system. To process natural language, the system may be trained with data derived from a database or corpus of knowledge, but the resulting outcome can be incorrect or inaccurate for a variety of reasons.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language systems (such as the IBM Watson® artificially intelligent computer system or other natural language interrogatory answering systems) process natural language based on system acquired knowledge. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use minimum data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

In the field of information technology (IT), electronic interfaces are commonly utilized for communication and organization, including but not limited to, electronic calendars, and social media platforms. Electronic communication relates to transmission of communications, e.g. messages, over a communications network. For example, an electronic calendar, also referred to herein as a computer calendar, is a program that enables people to record events and appointments in an electronic format. Electronic calendars have enhanced functionality of a non-electronic calendar. For example, electronic calendars enable automatic entries for regular events, as well as signaling of upcoming events. One form of an electronic calendar is known as a scheduler, and it enables groups of users connected to a network to coordinate their schedules. The scheduler allows members of a group to view members' calendars, and sends communication scheduling to the group members through electronic mail.

It is understood that communications in electronic form take place in one or more languages and across multiple electronic platforms. Examples of platforms include electronic email and various social media applications. A plurality of communications may be referred to herein as a conversation. It is understood that within the communications that comprise a conversation, there may be actionable items, e.g. the communications contain an exchange of action items. In Natural Language Processing (NLP) well-formed content, e.g. natural language text, is identified and interpreted. NLP is utilized to parse communication content and identify action statements and corresponding elements within electronic conversations. Actionable statements in conversations may be categorized into a number of classes depending on the context and domain Like most languages, usages within the English language may contain ambiguous terms, e.g. words, phrases, or sentences that are open to more than one interpretation. A well-known and established hypothesis is that a term's meaning is captured by the distribution of other words around it. An action instance within an actionable statement is focused around a verb and its left and right context in a corresponding statement. Identifying actionable items in a multi-lingual conversation, or in one embodiment across multiple languages, is challenging. The syntax and positioning of the action verb in the sentence may vary depending on the language.

In NLP, a token is a string of contiguous characters between two spaces, or between a space and punctuation marks. To process natural language, tokens within one or more sentences are identified and categorized. Identification may be directed at action verbs and associated action patterns are identified and learned. In one embodiment, a parser may be utilized to detect tokens within the sentence(s), such as noun, verb, comparator, adjective, noun phrase, etc. In one embodiment, a mood of the verb is subject to change based on its position in the sentence and how it is used in conjunction with prepositions.

It is understood in the art that NLP of sentences in one language may have a different interpretation in a different language. For example, the positioning of the tokens with respect to the verb may yield a different interpretation of the verb or in one embodiment a different mood of the verb. Identifying action items across two or more languages is challenging. Examples of such language include, but are not limited to, English, German, French, and Spanish. It is understood that electronic communications can be translated manually or through use of an electronic translator. However, regardless of the translation, nuances in the language may not be effectively communicated in the translation.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit (112) in communication with memory (116) across a bus (114). The server (110) is shown with an artificial intelligence (AI) platform (150) for cognitive computing, including NLP and ML, over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein configured with tools to enable supervised learning. The tools function to identify multi-lingual action tokens to support and enable multi-lingual action identification using machine learning techniques. The tools include, but are not limited to, a training manager (152), a language manager (154), an inference manager (also referred to herein as an inference module) (156), a converter (158), and an evaluator (160). The AI platform (150) may receive input from the network (105) and leverage a data source (170), also referred to herein as a corpus or knowledge base, to selectively access activity data. As shown the data source (170) is configured with a plurality of libraries, shown herein as a language library (172), a treebank library (174), a notation structure (176), and an inference module (178). In one embodiment, one or more of the libraries may be combined. Similarly, in one embodiment, one or more of the libraries may be distributed over the network (105). Accordingly, the AI platform (150) and the corresponding tools (152), (154), (156), (158) and (160) are operatively coupled to the data source (170) and the corresponding libraries (172) and (174).

The language library (172) contains a plurality of language structures, such as a data structure or dictionary corresponding to a specified or identified language. Details of how the language models are utilized are shown and described in detail below. It is understood that a plurality of different languages, such as English, German, Spanish, etc. may be supported, with the different languages having corresponding structures stored in the language library (172). As shown herein, the language library (172) is shown with a plurality of structures, referred to herein as models, each model representing a different supported language. The models shown herein include, but are not limited to, model$_A$ (172$_A$), model$_B$ (172$_B$), and model$_C$ (172$_C$). Although only three models are shown and represented herein, the quantity should not be considered limiting. In one embodiment, there may be a different quantity of models. Accordingly, the data source (170) is shown with a language library (172) to organize and store a plurality of models (172$_A$)-(172$_C$).

A treebank is a parsed text corpus that annotates syntactic or semantic sentence structure. As shown herein, a treebank functions to map one or more identified and extracted linguistic features and action verbs from an originating language of a conversation or statement to a base language. The treebank library (174) shown within the data source (170) contains a plurality of language treebanks that are accessible by the converter (158). Details of how the treebanks are utilized are shown and described in detail below. It is understood that each language is represented by a different treebank. Examples of treebanks include, but are not limited to, an English treebank, a German treebank, a Spanish treebank, etc. In the example shown herein, the treebanks include, but are not limited to treebank$_A$ (174$_A$), treebank$_B$ (174$_B$), and treebank$_C$ (174$_C$). Although only three treebank structures are shown and represented herein, the quantity should not be considered limiting. In one embodiment, treebanks may be added to the treebank library (174). Accordingly, the data source (170) is shown with the treebank library (174) to organize and store a plurality of treebanks.

Universal notation is directed at an annotation that translates across linguistic platforms, and in one embodiment is not language dependent. As shown herein, the data source (170) includes a notation structure (176), which in one embodiment is a data structure that contains a mapping of a language element to a universal representation that is language independent. In one embodiment, the notation structure (176) is a treebank or a collection of treebanks of different languages and language elements and corresponding universal representation of the language elements. Similarly, in one embodiment, the notation structure (176) includes an inventory of language patterns and corresponding universal representation(s). Accordingly, the data source (170) is shown with the notation structure (176) to organize and store mappings of language elements to a language independent representation.

Language, whether in written form or oral form, is comprised of communications that contain expressions. Examples of these expressions include, but are not limited to, statements, questions, requests, etc. These expressions act as category labels which can be applied to a received communication to provide information about the content of the communication. The inference module (178), shown herein local to the data source (170), is populated with patterns of category labels and corresponding action tokens. In one embodiment, the inference module (178) is leveraged by the inference manager (156) to identify a category label of a received communication based on the identified action tokens of the communication. Accordingly, the data source (170) is shown with the inference module (178), to organize and store category labels and corresponding action tokens.

It is understood that supervised learning leverages data from a data source. As shown herein, the data source (170), also referred to as a knowledge engine, is configured with domains and logically grouped activity data in the form of models, treebanks, structure(s), and module(s). The training manager (152) functions to train a machine learning model (MLM) and is further coupled to the language manager (154) and the converter (158). The training manager (152) receives a communication from the various computing devices (180), (182), (184), (186), (188), and (190) in communication with the network (105). Once collected, the language manager (154) leverages the language library (172) and determines the language of the received communication. The language manager (154) identifies the language model (172$_A$-172$_C$) to support the received, and in one embodiment detected, communication. The language manager (154) leverages the identified language model (172$_A$-

$172_C$) to identify one or more action tokens or linguistic features from the received communication. Examples of the extracted linguistic features include, but are not limited to, language patterns, action verbs, tense, mood, and linguistic features. Accordingly, the training manager (152) employs the language manager (154) to identify the language of the received communication and to further identify action tokens and linguistic features of the communication.

The training manager (152) leverages the converter (158) to create a first mapping of the identified action tokens and linguistic features. The converter (158) leverages at least one of the treebanks ($174_A$)-($174_C$) from the treebank library (174) to perform the mapping. The treebank leveraged by the converter will match or correspond to the language of the communication as is identified by the language manager (154). In one embodiment, the mapping performed by the converter (158) is a translation of one or more identified features of the communication from the received language to a base language. In one embodiment the identified features of the communication are mapped or translated to English. As an alternative to translating across languages, it is understood that aspects of the communication can be converted or translated to a universal notation. The converter (158) is shown operatively coupled to the data source (170), and can leverage the notation structure (176) to map the identified action tokens and linguistic features from the original language of the received communication to a universal notation independent of any language. Regardless of whether the language library (174) or the notation structure is leveraged (176), the language of the received communication is mapped to a second format that is different from a first format or language of the received communication. The converter (158) creates a map (196), also referred to herein as a first map, and populates the MLM with the map (196). In one embodiment, and as shown herein, the map (196) is stored local to the data source (170). The creation of the map (196) creates an inventory of mappings within the MLM. The greater the inventory in the MLM, the more efficient the MLM will function to identify patterns within one or more received communications. Accordingly, the converter (158) leverages the data source (170) and the language library (174) or the notation library (176) to map the identified action tokens and linguistic features to a second format which is then populated into the MLM.

The evaluator (160) which is shown operatively coupled to the language manager (154) and the converter (158) functions to identify a communication. The evaluator (160) receives a communication from one or more of the various computing devices (180), (182), (184), (186), (188), and (190) in communication with the network (105). The evaluator (160) employs the language manager (154) and the converter (158) in the same manner as discussed above. The language manager (154) leverages the language library (172) to identify the language of the received communication and further identifies action tokens and linguistic features from the communication. The converter (158) leverages the treebank library (174) or the notation structure (176) to map the communication from the received language to a second format, such as a base language or a universal notation. Accordingly, the evaluator (160) employs the language manager (154) and the converter (158) to identify the language, action token(s), and linguistic feature(s) of the received communication and maps the identified action tokens and linguistic features to a second format.

The inference manager (156), which is shown operatively coupled to the evaluator (160), functions to apply a category label to the communication identified by the evaluator (160). The inference manager (156) leverages the mapping from the communication, the trained MLM, and the inference module (178) to return a classification label to the received communication. The category label of the communication is predicted based on the translated action verbs and linguistic features and the assessment made by the MLM. In one embodiment, the category label maybe a tag or an identifier of the received or detected communication. Examples of category labels include, but are not limited to, determination of the communication being a statement, question, promise, request, etc. The category label is attached to the received or detected communication. In one embodiment, the category label is attached to the communication as an annotation, or embedded in the communication as metadata. Accordingly, the inference manager (156) functions to predict the category label of the received communication in a multi-lingual environment, such as an incoming message, and attach the label to the received or detected communication.

As shown, the network (105) may include local network connections and remote connections in various embodiments, such that the AI platform (150) may operate in environments of any size, including local and global, e.g. the Internet. Additionally, the AI platform (150) serves as a front-end system that can make available a variety of knowledge extracted from or represented in network accessible sources and/or structured data sources. In this manner, some processes populate the AI platform (150), with the artificial intelligence platform (150) also including input interfaces to receive requests and respond accordingly.

The knowledge base (170) is configured with libraries (172)-(174), structure(s) (176) and module(s) (178) for use by the AI platform (150). In one embodiment, the knowledge base (170) may be configured with other or additional sources of input, and as such, the sources of input shown and described herein should not be considered limiting. Similarly, in one embodiment, the knowledge base (170) includes structured, semi-structured, and/or unstructured content related to activities and tasks. The various computing devices (180)-(190) in communication with the network (105) may include access points for the logically grouped domains and models.

The network (105) may include local network connections and remote connections in various embodiments, such that the artificial intelligence platform (150) may operate in environments of any size, including local and global, e.g. the Internet. Additionally, the artificial intelligence platform (150) serves as a front-end system that can make available a variety of knowledge extracted from or represented in network accessible sources and/or structured data sources. In this manner, some processes populate the AI platform (150), with the AI platform (150) also including one or more input interfaces or portals to receive requests and respond accordingly.

The AI platform (150), via a network connection or an internet connection to the network (105), is configured to detect and manage network activity. The AI platform (150) may effectively orchestrate or optimize an orchestrated sequence of actions directed at related activity data by leveraging the knowledge base (170), which in one embodiment may be operatively coupled to the server (110) across the network (105).

The AI platform (150) and the associated tools (152)-(160) leverage the knowledge base (170) to support orchestration of the sequence of actions, and supervised learning to optimize the sequence of actions. The training manager (152) leverages the language manager (154) and the converter (158) to train the MLM with a received communication. The evaluator (160) leverages the language manager (154) and the converter to (158) to identify action tokens and linguistic characteristics of a received communication. The inference manager (156) leverages the evaluator (160) to assign a category label to a received communication. Accordingly, the tools (152)-(160) train a multi-lingual action identification model, also referred to herein as the MLM, and use the trained model, e.g. MLM, to predict and categorize an action associated with a communication.

Communications, e.g. electronic mail and messages, received across the network (105) may be processed by a server (110), for example IBM Watson® server, and the corresponding AI platform (150). As shown herein, the AI platform (150) together with the embedded tools (152)-(160) train a multi-lingual action identification model and use the trained model to predict and categorize an action associated with a communication. The function of the tools and corresponding analysis is to parse communication content and identify action statements and corresponding elements within electronic communications. Accordingly, the AI platform (150) receives and evaluates communications in a multi-lingual environment and assigns a category label to the received communication based on the identified action tokens and linguistic features.

In some illustrative embodiments, the server (110) may be the IBM Watson® system available from International Business Machines Corporation of Armonk, N.Y., which is augmented with the mechanisms of the illustrative embodiments described hereafter. The tools (152)-(160), hereinafter referred to collectively as AI tools, are shown as being embodied in or integrated within the AI platform (150) of the server (110). The AI tools may be implemented in a separate computing system (e.g., 190), or in one embodiment they can be implemented in one or more systems connected across network (105) to the server (110).

Types of devices and corresponding systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device or other devices that include a processor and memory.

Figure 2:
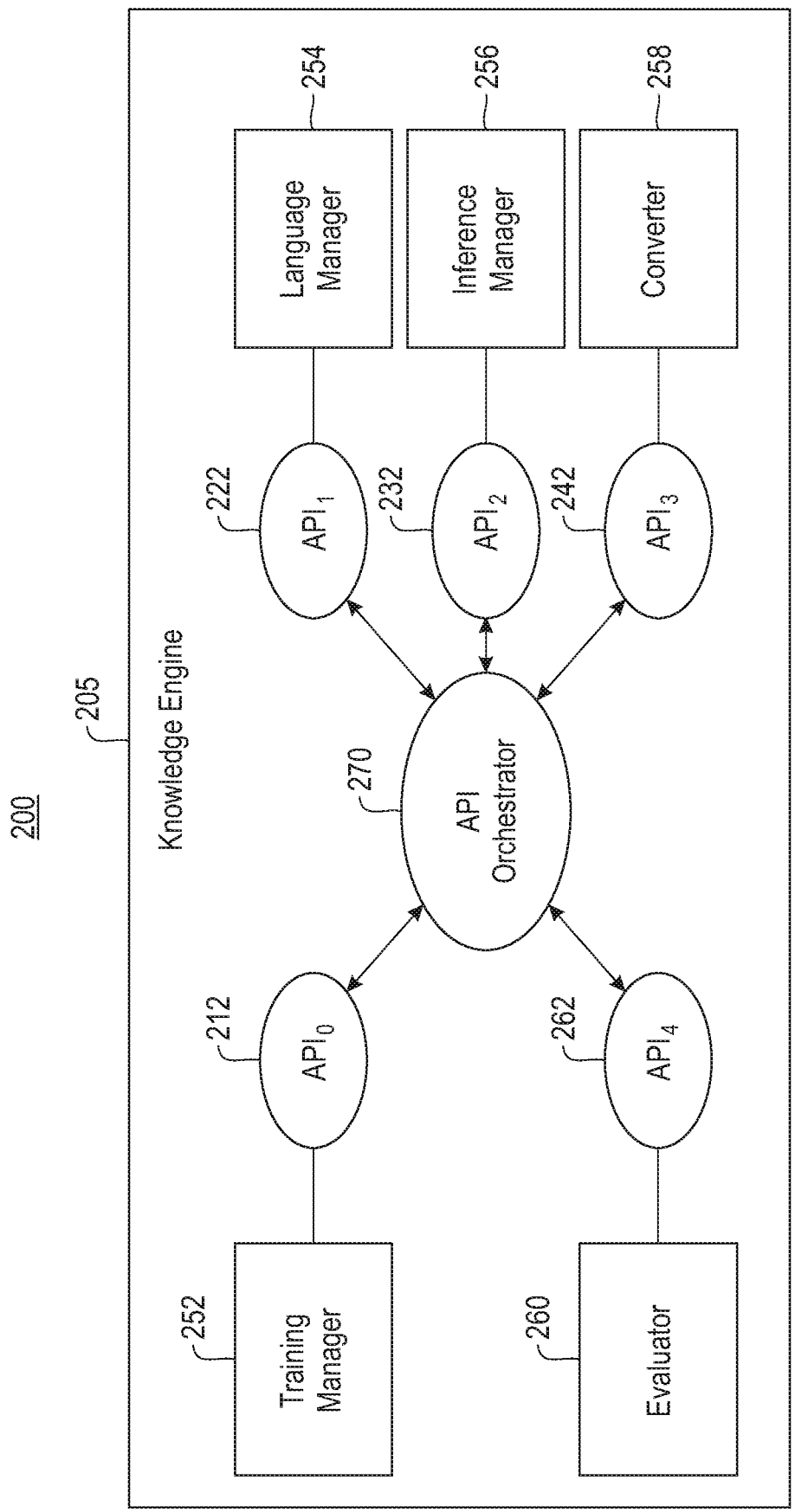
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152)-(160), shown herein as tools (252)-(260), and their associated functionality. Referring to FIG. 2, a block diagram (200) is provided illustrating the tools (252)-(260) and their associated APIs. As shown, a plurality of tools is embedded within the AI platform (205), with the tools including the training manager (152) shown herein as (252) associated with $API_0$ (212), the language manager (154) shown herein as (254) associated with $API_1$ (222), the inference manager (156) shown herein as (256) associated with $API_2$ (232), the converter (158) shown herein as (258) associated with $API_3$ (242), and the evaluator (160) shown herein as (260) associated with $API_4$ (262). Each of the APIs may be implemented in one or more languages and interface specifications. $API_0$ (212) provides functional support to train the MLM; $API_1$ (222) provides functional support to identify one or more action tokens or linguistic features from the received communication; $API_2$ (232) provides functional support to apply a category label to the communication, $API_3$ (242) provides functional support to create a mapping of the identified action tokens and linguistic features, $API_4$ (262) provides functional support to identify the received communication. As shown, each of the APIs (212), (222), (232), (242), and (262) are operatively coupled to an API orchestrator (270), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
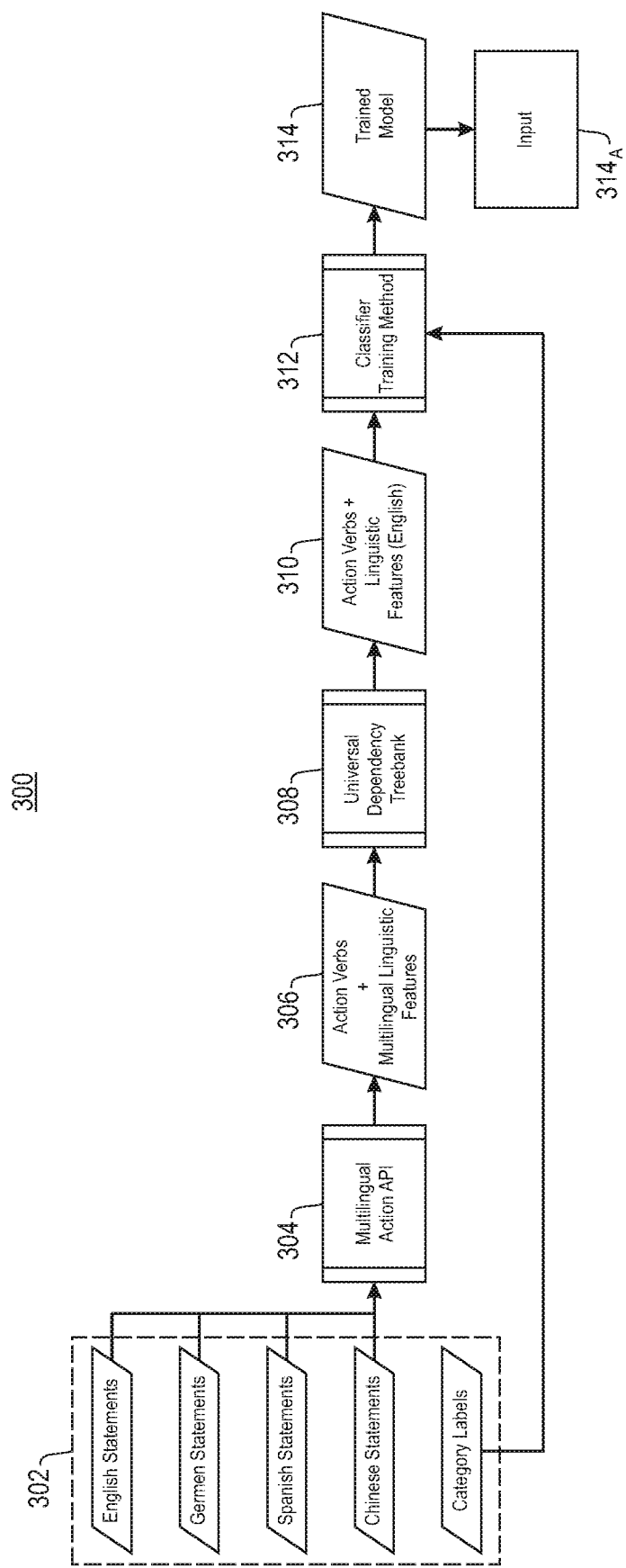
FIG. 3 depicts a flow diagram illustrating a process for training a machine learning model (MLM) to identify actionable items in a multi-lingual environment.

Referring to FIG. 3, a flow diagram (300) is provided to illustrate a process for training a machine learning model (MLM) to identify actionable items in a multi-lingual environment. As shown, communications are detected or received in one or more languages (302). In this example, the detected communications are in the form of statements and may be detected in one or more languages. It is understood that the communications are not limited to statements, and similarly, the languages are not limited to those shown herein. Rather the statements and languages shown are for illustrative purposes, and as such should not be considered limiting.

After the communication is detected (302) the language of the communication is identified (304). It is understood in the art that parts of speech may have different positioning in different languages. A multi-lingual action application program interface (API) is invoked and utilized to identify the language of the detected communication, and also to identify and extract linguistic features that are unique to the identified language from the detected communication (306). Examples of the extracted linguistic features include, but are not limited to, language patterns, action verbs, tense, mood, and linguistic features. In one embodiment, the multi-lingual API may be utilized to identify an action API that is specific to the language of the detected communication, with the identified action API performing the identification and action(s) as shown at (306). Accordingly, the first aspect of the statement and communication evaluation is directed at an API, or a comparable tool, to identify and parse specific grammatical components.

In linguistics, a treebank is a parsed text corpus that annotates syntactic or semantic sentence structure. As shown herein, a treebank is employed to map the identified and extracted linguistic features and action verbs from the original language of the conversation or statement to a base language (308). In one embodiment, the treebank at step (308) is referred to as a universal dependency treebank. Similarly, in one embodiment the base language is English. It is understood in the art that different languages may have different representative treebanks, such as one treebank per supported language. The universal dependency treebank shown at step (308) is an inventory or collection of trees for a plurality of supported languages. For example, in one embodiment, a treebank exists to map Spanish linguistic features to English. The mapping at step (308) identifies a relationship between the identified linguistic features and action verbs in the originating language and comparable linguistic features and action verbs in a corresponding, identified, or selected base language, e.g. English. The linguistic features and action verbs identified in the treebank at step (308) are converted to the base language (310). The converted action verbs and linguistic features are used to train a classifier directed at matching linguistic features and action verbs to a corresponding category label (312). As shown, one or more category label(s) (314) are utilized as input ($314_A$) or input features to the classifier training at step (312). In one embodiment, the classifier subject to training at step (312) is a MLM. Input to the training at step (312) includes the independent language features generated at step (310), and in one embodiment includes any previously generated category labels ($314_A$). As shown herein, the output of the training generates the MLM (314). By training the classifier, e.g. MLM, with the converted action verbs and linguistic features, the MLM becomes proficient at predicting category labels to assign to incoming communications in a multi-lingual environment. Accordingly, the translated action verbs and linguistic features from the communication are used to train the classifier.

Figure 4:
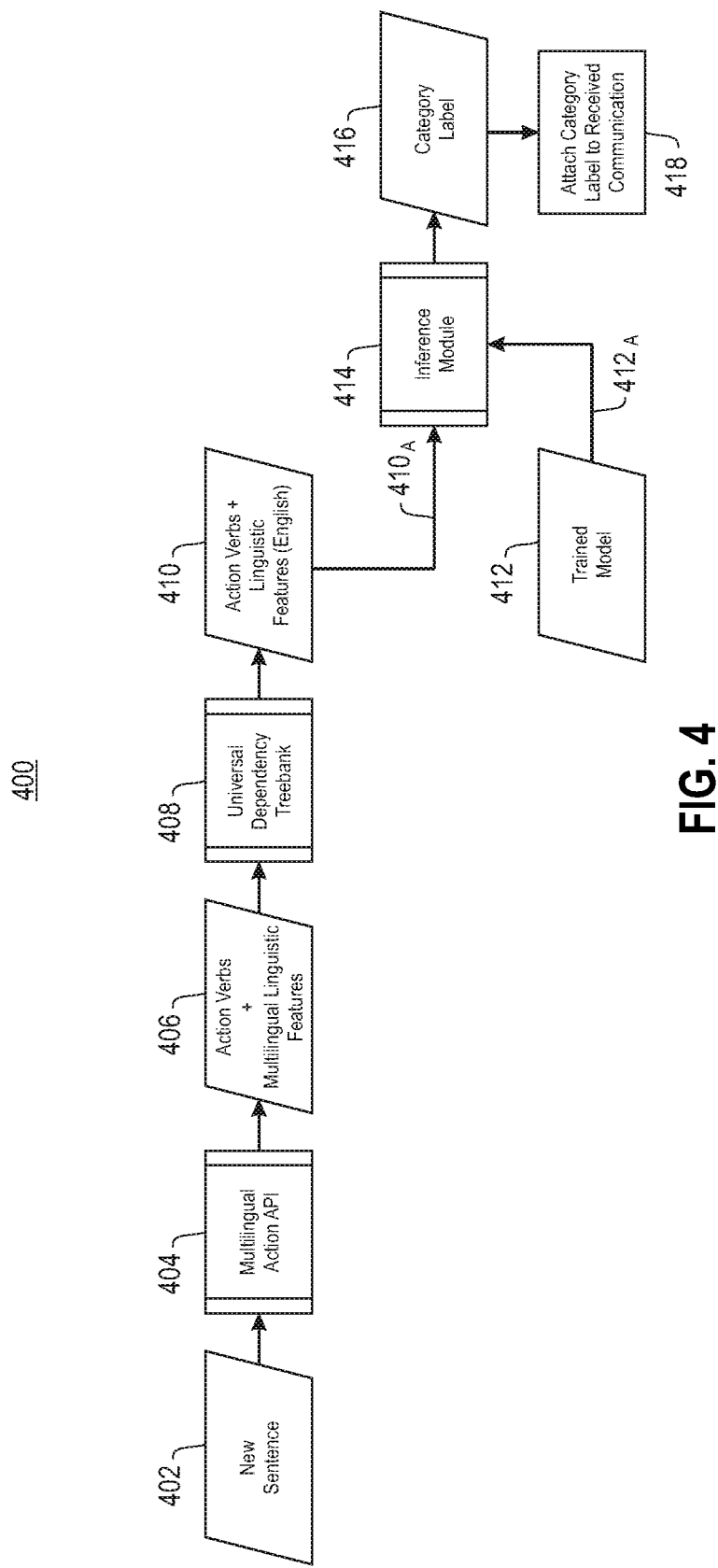
FIG. 4 depicts a flow diagram illustrating employing the training classifier to apply category labels to received communications in a multi-lingual environment.

Referring to FIG. 4, a flow diagram (400) is provided to illustrate employing the training classifier to apply category labels to received communications in a multi-lingual environment. As shown, communications are detected or received in one or more languages (402). Similar to the training process shown and described in FIG. 3, the multi-lingual API is invoked and utilized to identify the language of the detected communication (404), and to extract linguistic features that are unique to the identified language from the detected communication (406). Examples of the extracted linguistic features include, but are not limited to, language patterns, action verbs, tense, mood, action verbs, and linguistic features. In one embodiment, the multi-lingual API may be utilized to identify an action API that is specific to the language of the detected communication, with the identified action API performing the identification and action(s) as shown at step (406). The language of the received or detected communication is identified and the multi-lingual API is invoked and utilized to extract unique action verbs and linguistic features from the received or detected communication. Accordingly, the API identifies and parses specific grammatical components from the communication.

Similar to the treebank shown and described in FIG. 3, e.g. step (306), the treebank is employed to map the identified and extracted action verbs and linguistic features from the original language of the received or detected communication to an identified base language (408). The mapping at step (408) identifies a relationship between the identified linguistic features and action verbs in the originating language and comparable linguistic features and action verbs in the base language. The linguistic features and action verbs identified in the treebank are converted to the base language (410). The converted action verbs and linguistic features from step (410) and the trained classifier (412), e.g. the classifier trained in FIG. 3, are employed as input ($410_A$) and ($412_A$) to an inference module (414) to predict and create a category label for the received or detected communication (416). The category label of the communication is predicted based on the translated action verbs and linguistic features and the assessment made by the classifier. In one embodiment, the category label maybe a tag or an identifier of the received or detected communication. Examples of category labels include, but are not limited to, determination of the communication being a statement, question, promise, request, etc. The category label is attached to the received or detected communication (418). In one embodiment, the category label is attached to the communication as an annotation, or embedded in the communication as metadata. Accordingly, the trained classifier is employed to predict the category label of a received or detected communication in a multi-lingual environment, such as an incoming message, and attach the label to the received or detected communication.

Figure 5:
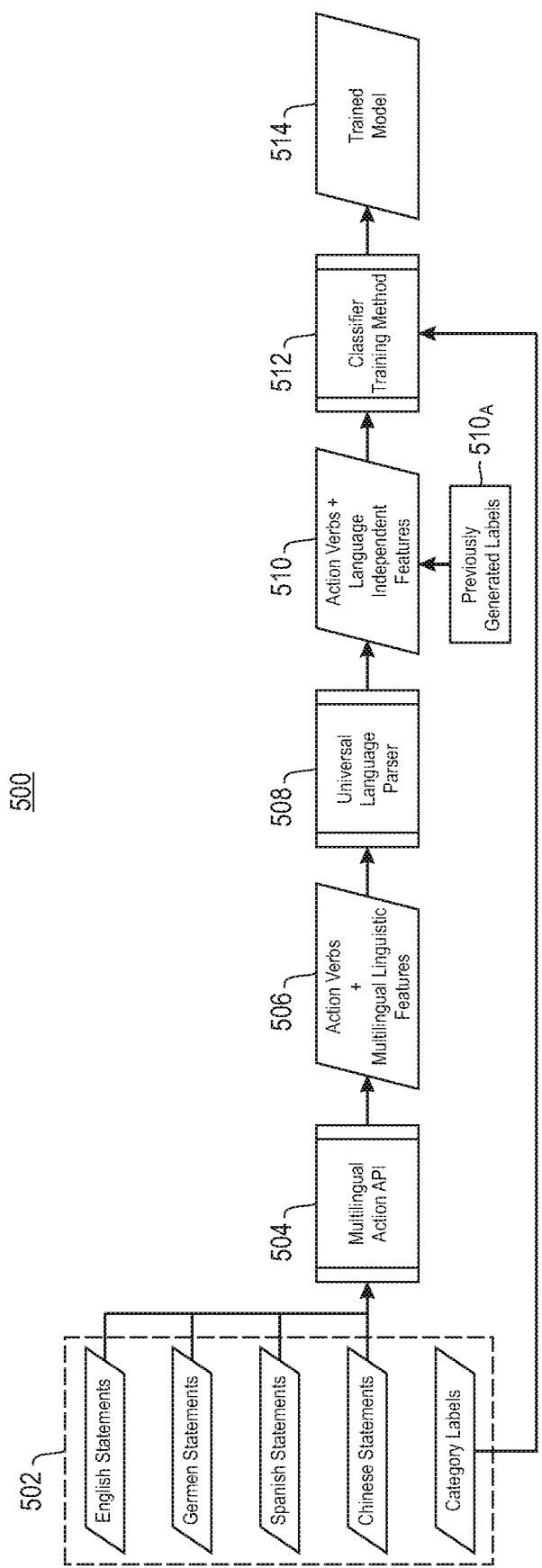
FIG. 5 depicts a flow diagram illustrating a process for training a MLM to identify actionable items in a multi-lingual environment using universal notation.

Referring to FIG. 5, a flow diagram (500) is provided to illustrate a process for training a MLM to identify actionable items in a multi-lingual environment using universal notation. Similar to the process shown in FIG. 3, communications are detected or received in one or more languages (502). A multi-lingual action API is invoked and utilized to identify the language of the detected communication (504), and also to identify and extract linguistic features that are unique to the identified language from the detected communication (506). Accordingly, the first aspect of the communication evaluation is directed at an API, or a comparable tool, to identify and parse specific grammatical components.

A universal language parser is employed to map the identified and extracted linguistic features and action verbs from the original language of the received communication to a universal notation that is independent of any language (508). The universal language parser is applied to words that are extracted as linguistic features and maps the extracted linguistic features to language independent features. Examples of the extracted linguistic features include, but are not limited to, language patterns, action verbs, tense, mood, action verbs, and linguistic features. The linguistic features and action verbs identified at step (508) are converted to the language independent features (510). The language independent features are used to train a classifier directed at matching linguistic features and action verbs to a corresponding category label (512). In one embodiment, the classifier subject to training at step (512) is a MLM. Input to the training at step (512) includes the independent language features generated at step (510), and in one embodiment includes any previously generated category labels ($510_A$). As shown herein, the output of the training generates the MLM (514). By training the classifier, e.g. MLM, with the language independent features, the MLM becomes proficient at predicting category labels to assign to incoming communications in a multi-lingual environment. Accordingly the converted linguistic features and action verbs from the communication are used to train the classifier.

Figure 6:
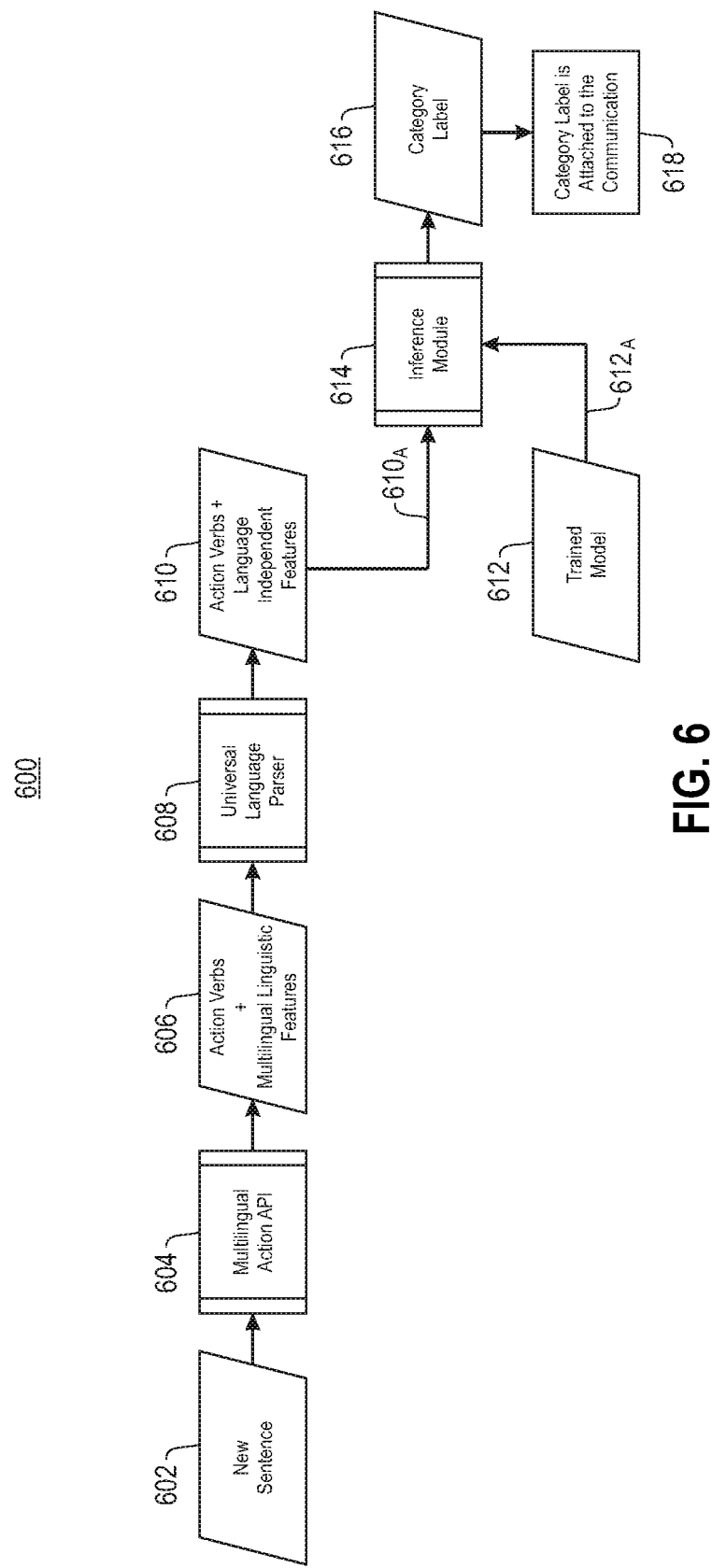
FIG. 6 depicts a flow diagram illustrating employing the trained classifier to apply category labels to received communications in a multi-lingual environment using universal notation.

Referring to FIG. 6, a flow diagram (600) is provided to illustrate employing the trained classifier to apply category labels to received communications in a multi-lingual environment using universal notation. As shown, communications are detected or received in one or more languages (602). Similar to the training process shown and described in FIG. 5, the multi-language API is invoked and utilized to identify the language of the detected communication (604), and to extract linguistic features that are unique to the identified language from the detected communication (606). In one embodiment, the multi-lingual API may be utilized to identify an action API that is specific to the language of the detected communication, with the identified action API performing the linguistic feature(s) extraction as shown at step (606). The language of the received or detected communication is identified and the multi-lingual API is invoked and utilized to extract unique action verbs and linguistic features from the received or detected communication. Accordingly, the API identifies and parses specific grammatical components from the communication corresponding to the language of the detected or received communication.

Similar to the universal language parser shown and described in FIG. 5, e.g. step (506), the universal language parser is employed to map the identified and extracted action verbs and linguistic features from the original language of the received or detected communication to language independent universal notation (608). The mapping at step (608) identifies a relationship between the identified linguistic features and action verbs in the originating language and comparable language independent features in the universal notation. The linguistic features and action verbs identified in the universal language parser are converted to the language independent features (610). The converted action verbs and linguistic features from step (610) and the trained classifier (612), e.g. the classifier trained in FIG. 5, are employed as input ($610_A$) and ($612_A$) to an inference module (614) to predict and create a category label for the received or detected communication (616). The category label of the communication is predicted based on the converted action verbs and linguistic features and the assessment made by the classifier. In one embodiment, the category label maybe a tag or an identifier corresponding to the received or detected communication. Examples of category labels include, but are not limited to, determination of the communication being a statement, question, promise, request, etc. The category label is attached to the received or detected communication (618). In one embodiment, the category label is attached to the communication as an annotation, or embedded in the communication as metadata. Accordingly, the trained classifier is employed to predict the category label of a received or detected communication in a multi-lingual environment, such as an incoming message, and attach the label to the received or detected communication.

Embodiments shown and described herein may be in the form of a computer system for use with an intelligent computer platform for providing orchestration of activities across one or more domains. Aspects of the tools (152)-(160) and their associated functionality may be embodied in a computer system/server in a single location, or in one embodiment, may be configured in a cloud based system sharing computing resources. With references to FIG. 7, a block diagram (700) is provided illustrating an example of a computer system/server (702), hereinafter referred to as a host (702) in communication with a cloud based support system, to implement the system, tools, and processes described above with respect to FIGS. 1-6. Host (702) is operational with numerous other general purpose or special purpose computing system environments or configurations. Examples of well-known computing systems, environments, and/or configurations that may be suitable for use with host (702) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (702) may be described in the general context of computer system-executable instructions, such as program modules, being executed by a computer system. Generally, program modules may include routines, programs, objects, components, logic, data structures, and so on that perform particular tasks or implement particular abstract data types. Host (702) may be practiced in distributed cloud computing environments where tasks are performed by remote processing devices that are linked through a communications network. In a distributed cloud computing environment, program modules may be located in both local and remote computer system storage media including memory storage devices.

Figure 7:
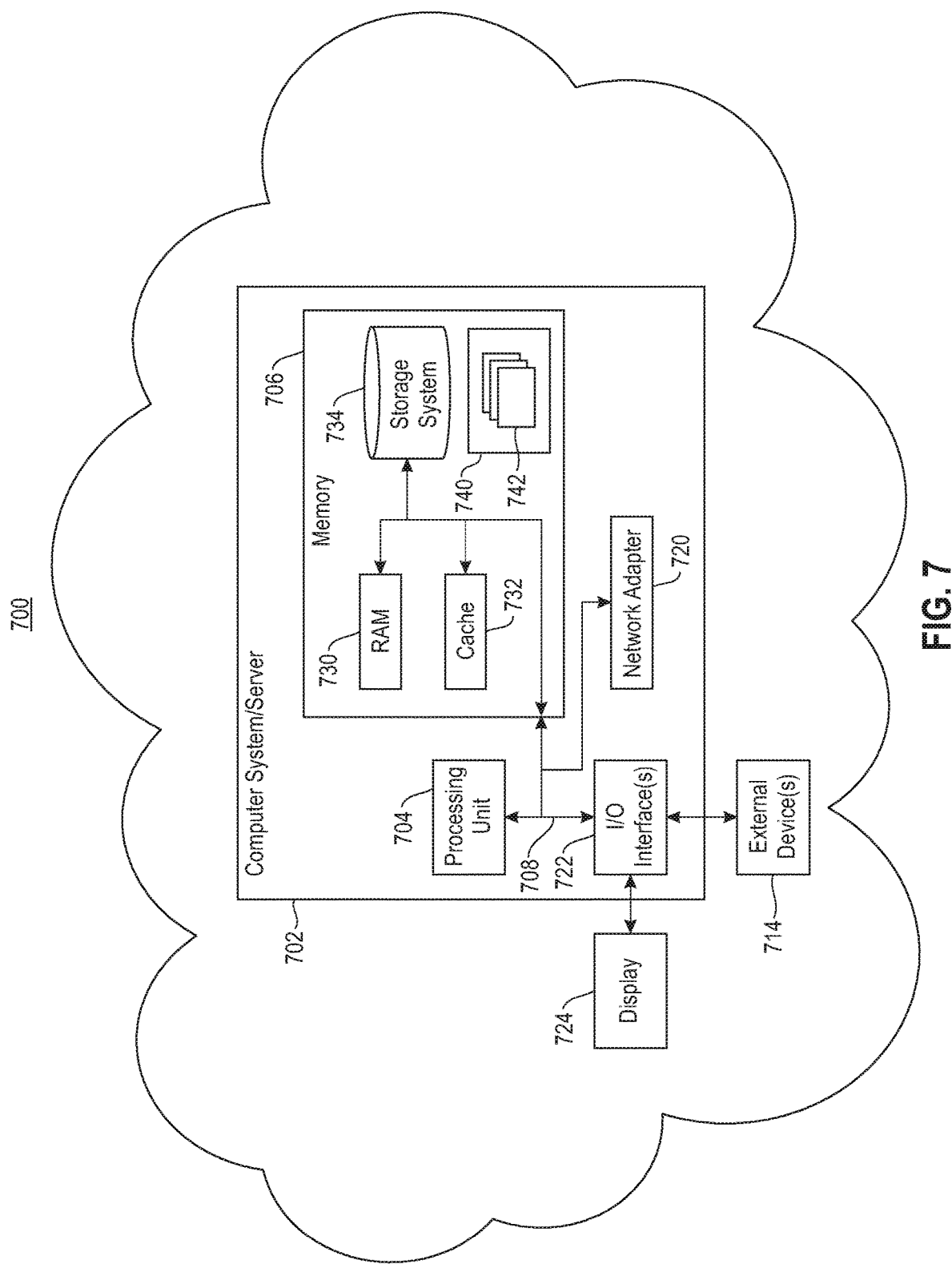
FIG. 7 depicts a block diagram illustrating an example of a computer system/server of a cloud based support system, to implement the system and processes described above with respect to FIGS. 1-6.

As shown in FIG. 7, host (702) is shown in the form of a general-purpose computing device. The components of host (702) may include, but are not limited to, one or more processors or processing units (704), e.g. hardware processors, a system memory (706), and a bus (708) that couples various system components including system memory (706) to processor (704). Bus (708) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (702) and it includes both volatile and non-volatile media, removable and non-removable media.

Memory (706) can include computer system readable media in the form of volatile memory, such as random access memory (RAM) (730) and/or cache memory (732). By way of example only, storage system (734) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (708) by one or more data media interfaces.

Program/utility (740), having a set (at least one) of program modules (742), may be stored in memory (706) by way of example, and not limitation, as well as an operating system, one or more application programs, other program modules, and program data. Each of the operating systems, one or more application programs, other program modules, and program data or some combination thereof, may include an implementation of a networking environment. Program modules (742) generally carry out the functions and/or methodologies of embodiments to dynamically orchestrate of activities across one or more domains. For example, the set of program modules (742) may include the tools (152)-(160) as described in FIG. 1.

Host (702) may also communicate with one or more external devices (714), such as a keyboard, a pointing device, etc.; a display (724); one or more devices that enable a user to interact with host (702); and/or any devices (e.g., network card, modem, etc.) that enable host (702) to communicate with one or more other computing devices. Such communication can occur via Input/Output (I/O) interface(s) (722). Still yet, host (702) can communicate with one or more networks such as a local area network (LAN), a general wide area network (WAN), and/or a public network (e.g., the Internet) via network adapter (720). As depicted, network adapter (720) communicates with the other components of host (702) via bus (708). In one embodiment, a plurality of nodes of a distributed file system (not shown) is in communication with the host (702) via the I/O interface (722) or via the network adapter (720). It should be understood that although not shown, other hardware and/or software components could be used in conjunction with host (702). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (706), including RAM (730), cache (732), and storage system (734), such as a removable storage drive and a hard disk installed in a hard disk drive.

Computer programs (also called computer control logic) are stored in memory (706). Computer programs may also be received via a communication interface, such as network adapter (720). Such computer programs, when run, enable the computer system to perform the features of the present embodiments as discussed herein. In particular, the computer programs, when run, enable the processing unit (704) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (702) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 8:
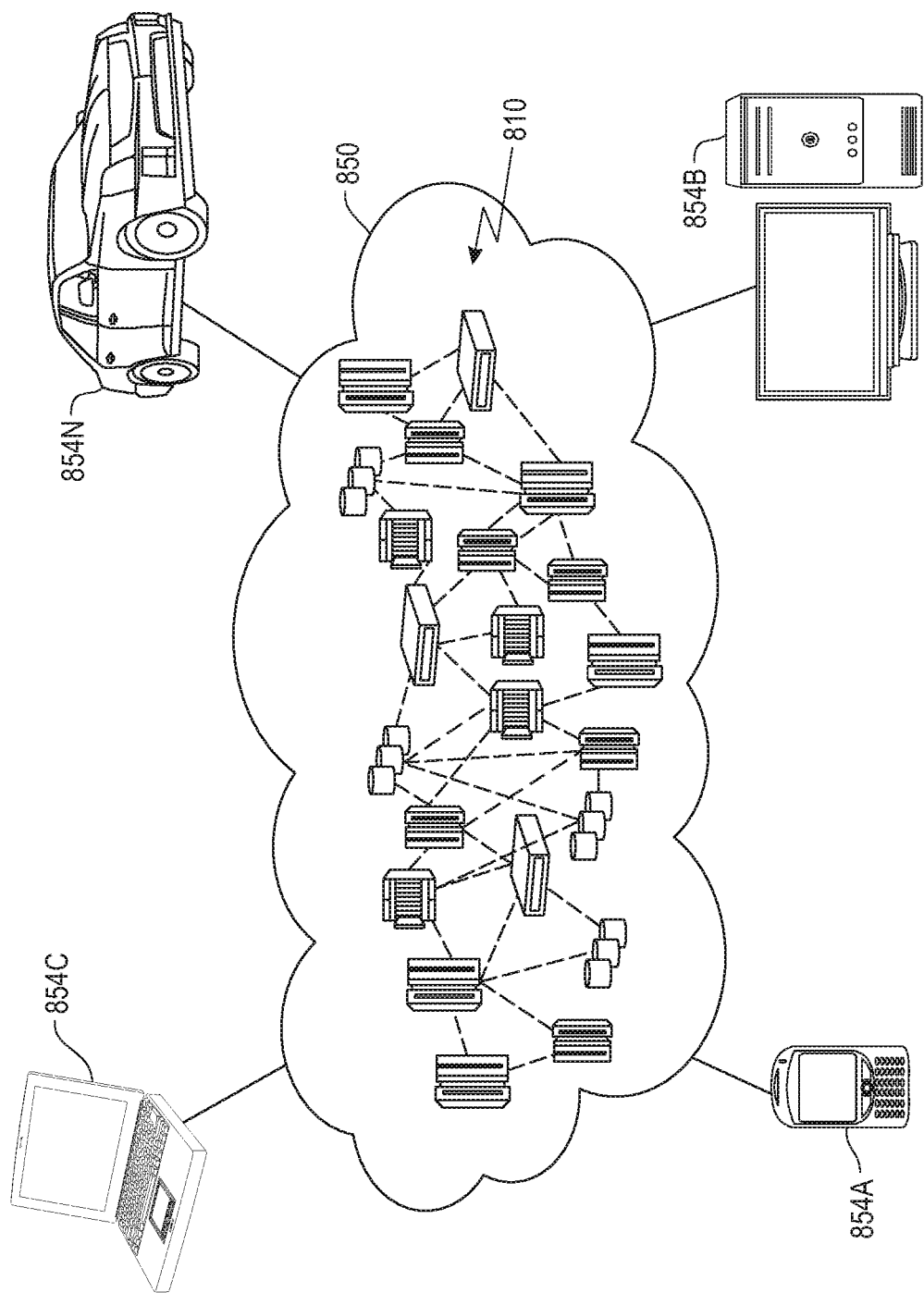
FIG. 8 depicts a block diagram illustrating a cloud computer environment.

Referring now to FIG. 8, an illustrative cloud computing network (800). As shown, cloud computing network (800) includes a cloud computing environment (850) having one or more cloud computing nodes (810) with which local computing devices used by cloud consumers may communicate. Examples of these local computing devices include, but are not limited to, personal digital assistant (PDA) or cellular telephone (854A), desktop computer (854B), laptop computer (854C), and/or automobile computer system (854N). Individual nodes within nodes (810) may further communicate with one another. They may be grouped (not shown) physically or virtually, in one or more networks, such as Private, Community, Public, or Hybrid clouds as described hereinabove, or a combination thereof. This allows cloud computing environment (800) to offer infrastructure, platforms and/or software as services for which a cloud consumer does not need to maintain resources on a local computing device. It is understood that the types of computing devices (854A-N) shown in FIG. 8 are intended to be illustrative only and that the cloud computing environment (850) can communicate with any type of computerized device over any type of network and/or network addressable connection (e.g., using a web browser).

Figure 9:
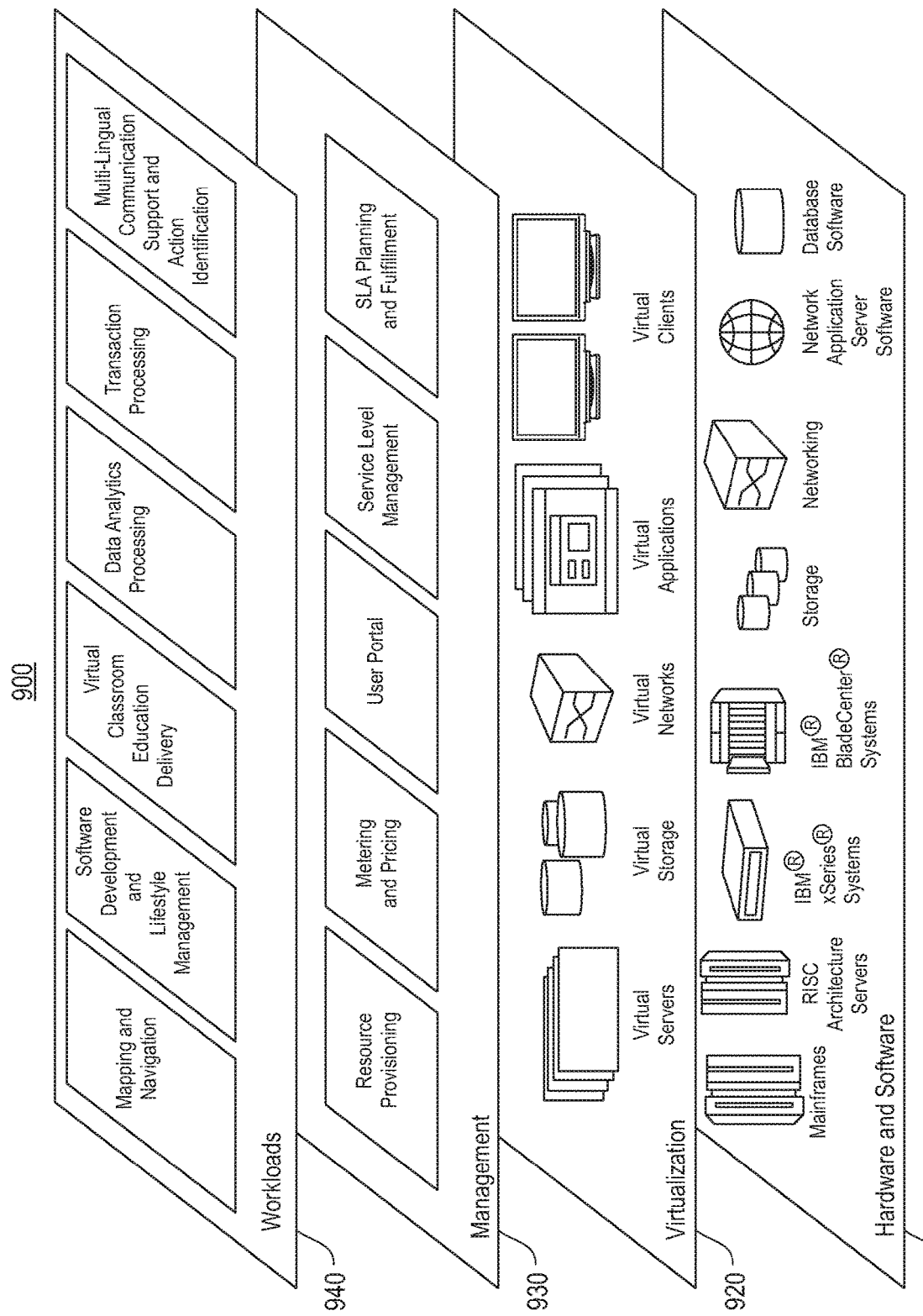
FIG. 9 depicts a block diagram illustrating a set of functional abstraction model layers provided by the cloud computing environment.

Referring now to FIG. 9, a set of functional abstraction layers (900) provided by the cloud computing network of FIG. 8 is shown. It should be understood in advance that the components, layers, and functions shown in FIG. 9 are intended to be illustrative only, and the embodiments are not limited thereto. As depicted, the following layers and corresponding functions are provided: hardware and software layer (910), virtualization layer (920), management layer (930), and workload layer (940).

The hardware and software layer (910) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (920) provides an abstraction layer from which the following examples of virtual entities may be provided: virtual servers; virtual storage; virtual networks, including virtual private networks; virtual applications and operating systems; and virtual clients.

In one example, management layer (930) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (940) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and multi-lingual communication support and action identification.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processing unit operatively coupled to memory;
an artificial intelligence (AI) platform, in communication with the processing unit, having natural language processing (NLP) tools comprising:
a training manager configured to train an action identification machine learning model (MLM), the training manager operatively coupled to a language manager and a converter, the language manager configured to identify an originating language of a received first communication, to leverage the identified originating language, and to identify one or more action tokens and one or more linguistic features in the first communication, the converter configured to create a first map of the identified one or more action tokens and one or more linguistic features from a first format of the originating language to a second format comprising a universal notation or a base language that is different than the originating language of the first communication, and the converter configured to populate the created first map into the action identification MLM; and an evaluator configured to identify a second communication, including, the language manager configured to identify the originating language of the second communication, to leverage the identified second communication language, and to identify one or more action tokens and one or more linguistic features in the second communication, the converter configured to create a second map of the identified one or more action tokens and one or more linguistic features from the second communication to the second format comprising the universal notation or the base language that is different than the originating language of the second communication;

an inference manager configured to predict an action token class of the second communication, including to submit the trained action identification MLM and the created second map to an inference module populated with patterns of category labels and corresponding action tokens, and to return the predicted action token class of the identified one or more action tokens in the second communication; and the inference manager configured to return an assignment of the predicted action token class to the second communication.

2. The system of claim 1, wherein the converter is further configured to leverage a universal language parser and convert the first map, the second map, or the first and second maps of the identified one or more action tokens and one or more linguistic features of the first communication, the second communication, or the first and second communications to the universal notation.

3. The system of claim 1, wherein the converter is further configured to leverage a universal treebank and convert the first map, the second map, or the first and second maps of the identified one or more action tokens and one or more linguistic features of the first communication, the second communication, or the first and second communications to the base language.

4. The system of claim 3, wherein the training manager is configured to store the predicted action token class of the second communication and the one or more action tokens of the second communication in the inference module inventory.

5. The system of claim 4, wherein the training manager is configured to update the inventory of mapped action tokens and one or more language independent features across two or more languages.

6. The system of claim 1, further comprising a multilingual application program interface (API) to detect the originating language of the first and second communications.

7. A computer program product to identify and process a communication across multiple languages, the computer program product comprising:
a computer readable storage medium having program code embodied therewith, the program code executable by a processor to:
train an action identification machine learning model (MLM), including:
identify an originating language of a received first communication, wherein the identification further includes program code executable by the processor to identify one or more action tokens and one or more linguistic features in the first communication;
create a first map of the identified one or more action tokens and one or more linguistic features from a first format of the originating language to a second format comprising a universal notation or a base language that is different than the originating language of the first communication; and
populate the created first map into the action identification MLM;
identify a second communication, including program code executable by the processor to identify the originating language of the second communication, wherein the identification further includes identifying one or more action tokens and one or more linguistic features in the second communication;
create a second map of the identified one or more action tokens and one or more linguistic features from the second communication to the second format comprising the universal notation or the base language that is different than the originating language of the second communication;
predict an action token class of the second communication, including submit the trained action identification MLM and the created second map to an inference module populated with patterns of category labels and corresponding action tokens, the inference module configured to return the predicted action token class of the identified one or more action tokens in the second communication; and
assign the predicted action token class to the second communication.

8. The computer program product of claim 7, further comprising program code executable by the processor to leverage a universal language parser and convert the first map, the second map, or the first and second maps of the identified one or more action tokens and one or more linguistic features of the first communication, the second communication, or the first and second communications to the universal notation.

9. The computer program product of claim 7, further comprising program code executable by the processor to leverage a universal treebank and convert the first map, the second map, or the first and second maps of the identified one or more action tokens and one or more linguistic features of the first communication, the second communication, or the first and second communications to the base language.

10. The computer program product of claim 9, further comprising program code executable by the processor to store the predicted action token class of the second communication and the one or more action tokens of the second communication in the inference module inventory.

11. The computer program product of claim 10, further comprising program code executable by the processor to update the inventory of mapped action tokens and one or more language independent features across two or more languages.

12. The computer program product of claim 7, further comprising program code executable by the processor to detect the originating language of the first and second communications.

13. A method comprising:
  training, using a computer processor, an action identification machine learning model (MLM), including:
    identifying an originating language of a received first communication, wherein the identification further includes identifying one or more action tokens and one or more linguistic features in the first communication;
    creating a first map of the identified one or more action tokens and one or more linguistic features from a first format of the originating language to a second format comprising a universal notation or a base language that is different than the originating language of the first communication; and
    populating the created first map into the action identification MLM;
  identifying, using the computer processor, a second communication, including:
    identifying the originating language of the second communication, wherein the identification further includes identifying one or more action tokens and one or more linguistic features in the second communication; and
    creating a second map of the identified one or more action tokens and one or more linguistic features from the second communication to the second format comprising the universal notation or the base language that is different than the originating language of the second communication;
  predicting, using the computer processor, an action token class of the second communication, including submitting the trained action identification MLM and the created second map to an inference module populated with patterns of category labels and corresponding action tokens, the inference module returning the predicted action token class of the identified one or more action tokens in the second communication; and
  assigning, using the computer processor, the predicted action token class to the second communication.

14. The method of claim 13, further comprising, using the computer processor, leveraging a universal language parser and converting the first map, the second map, or the first and second maps of the identified one or more action tokens and one or more linguistic features of the first communication, the second communication, or the first and second communications to the universal notation.

15. The method of claim 13, further comprising, using the computer processor, leveraging a universal treebank and converting the first map, the second map, or the first and second maps of the identified one or more action tokens and one or more linguistic features of the first communication, the second communication, or the first and second communications the base language.

16. The method of claim 15, further comprising, using the computer processor, storing the predicted action token class of the second communication and the one or more action tokens of the second communication in the inference module inventory.

17. The system of claim 16, further comprising updating the inventory of mapped action tokens and one or more language independent features across two or more languages.

18. The method of claim 13, further comprising using a multi-lingual application program interface (API) to detect the originating language of the first and second communications.

* * * * *